US006897902B1

(12) United States Patent
Van Asma

(10) Patent No.: US 6,897,902 B1
(45) Date of Patent: May 24, 2005

(54) DIGITAL VIDEO-PROCESSING UNIT

(75) Inventor: Cornelis G. M. Van Asma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/577,547

(22) Filed: May 24, 2000

(30) Foreign Application Priority Data

May 26, 1999 (EP) .............................................. 99201655

(51) Int. Cl.[7] ........................... H04N 11/20; H04N 7/01
(52) U.S. Cl. ...................... 348/458; 348/714; 348/718; 348/581; 348/425.1
(58) Field of Search ................................ 348/714, 715, 348/716, 717, 718, 719, 458, 443, 445, 581, 425.1, 845, 561, 562, 704; 345/127, 154, 202

(56) References Cited

U.S. PATENT DOCUMENTS

| 5,633,687 | A | * | 5/1997 | Bhayani et al. ............. 348/441 |
| 5,717,461 | A | * | 2/1998 | Hoogenboom ............... 348/715 |
| 6,151,074 | A | * | 11/2000 | Werner ..................... 348/425.1 |
| RE37,620 | E | * | 4/2002 | Nuber et al. ................. 348/465 |
| 6,426,771 | B1 | * | 7/2002 | Kosugi ........................ 348/222 |
| 6,486,918 | B1 | * | 11/2002 | Min ........................ 348/425.1 |
| 6,529,249 | B2 | * | 3/2003 | Hashemi ..................... 348/714 |

FOREIGN PATENT DOCUMENTS

EP          0840522         5/1998  ............ H04N/9/30

* cited by examiner

Primary Examiner—John Miller
Assistant Examiner—Trang U. Tran

(57) ABSTRACT

In a video-processing unit comprising a processing means, memory means and a memory manager, an output of the processing means is coupled to the memory manager for storing of the processed data from the processing means in the memory means to allow execution of different processes in video-processing unit by a single processing means.

8 Claims, 2 Drawing Sheets

DIGITAL VIDEO-PROCESSING UNIT

TECHNICAL FIELD

Figure 1:
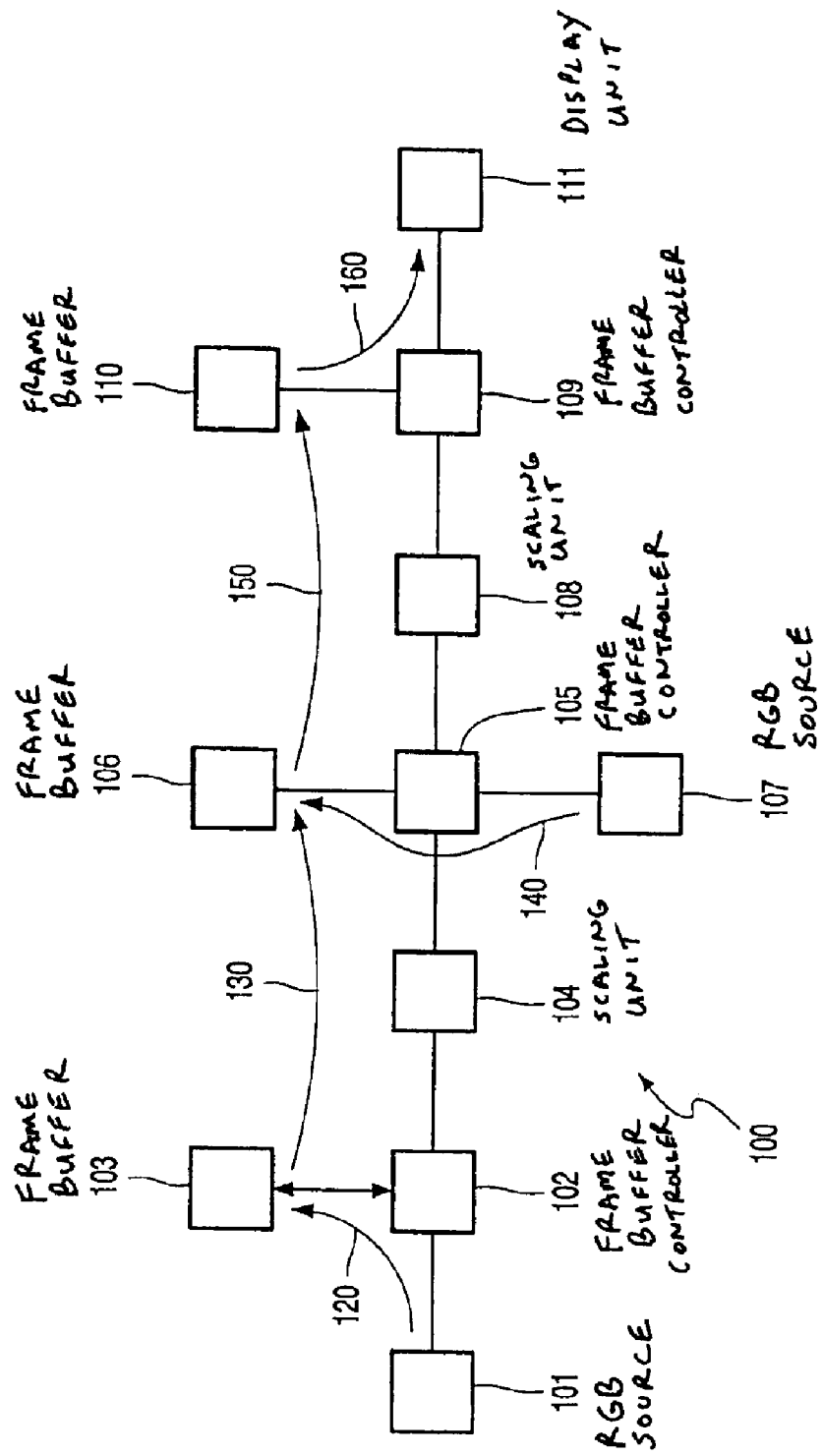

The invention relates to a digital video-processing unit for processing an input signal to an output data signal for an output device, said video-processing unit comprising
  processing means for processing the input signal to the output data signal,
  memory means for storing said input signal prior to supply to said processing means, and
  a memory manager coupled to the processing means and the memory means, the memory manager being arranged to transfer the input data signals to the memory means and to transfer the stored input data signal to the processing means, respectively.

The invention further relates to a video display system.

BACKGROUND AND SUMMARY

Such a video-processing system and data display system are known from European patent application EP-A 840522. This patent application describes a video-processing unit which is used in video display systems based on spatial light modulators such as a liquid crystal display or a digital micro-mirrored device (DMD). These spatial light modulators comprise a number of pixels arranged in a rectangular matrix. This matrix comprises a number of rows and columns. Each row comprises an equal number of the pixels. In general, the number of rows does not match with a number of rows of the input data signal to be displayed, or the aspect ratio of the image represented by the input data signal does not match with the aspect ratio of the spatial light modulator. Therefore, the processing means resizes the input data in such a way that the number of rows of the resized output data matches the number of rows of the matrix, or the aspect ratio of the image of the resized data output signal matches the aspect ratio of the matrix. The resizing operation requires some kind of filtering or interpolating. Therefore, information corresponding to more than one line of the image is required. The memory means is used for this information. In the known video-processing unit, the memory means precedes the processing means and the resized output data is coupled to a video output unit. Processed information is thus transferred to a subsequent process.

A disadvantage of the known video-processing unit is that a display-specific type of processing cannot be performed in this video-processing unit, for example a bit plane conversion in order to drive the single reflective LCD panel or the DMD panel or a keystone correction for geometric distortions.

It is, inter alia, an object of the invention to provide a video-processing unit with a flexible architecture which is capable of both handling resizing input data and other types of processing. To this end, a video-processing unit according to the invention is characterized in that an output of the processing means is coupled to an input of the memory manager, and in that the memory manager is further arranged to transfer the output data signal from the processing means to the memory means for storing the output data signal, and to transfer the stored output data signal from the memory means to the output device. Feedback of the output data signal to the memory manager enables the storage of the scaled data output signal in the memory. As a result, the stored scaled data output signal can be used as a further input signal for a second or further kind of operation by the processing means such as the display-specific processing of the resized data output signal. The available bandwidth for the memory means and the size of the memory means limits the number of possible processes in the video-processing unit. Furthermore, the feedback of the processing means to the memory manager enables the realization of two kinds of data-processing architectures. In a first architecture, the processing means is situated behind the memory means, for example a frame buffer, and in a second architecture, the processing means precedes the frame buffer. So, advantages of both processing architectures may be available. A first advantage in the case of the processing means being situated behind the frame buffer is that a horizontal interleaved sampling of an image is possible. This allows an A/D converter to run at half an actual clock frequency corresponding to the input data signal and may lead to the application of economic A/D converters. Further advantages are that an optimum scaling of interlaced still images is possible and that a minimum number of line memories is required.

A first advantage in the case of the processing means precedes the frame buffer is that the On-Screen-Display (OSD) image is not scaled. As a result, the size of the OSD image is independent of the resolution of the incoming video data. A further advantage is that, by sharing the memory and the processing means for different processes, an economic design of the video-processing to a single chip is possible.

A particular embodiment of the video-processing unit according to the invention is characterized in that the memory manager is further arranged to transfer the stored data output signal to the processing means, and said processing means is further arranged to execute a further operation on the stored data output signal. For example, a first process may be a resizing operation on the input data into the resize output data. A second process may be a display-specific operation on the resized output data into a display-specific output data.

A further embodiment of the video-processing unit according to the invention is characterized in that said processing means and said memory manager are arranged to execute different processes in time multiplex.

A further embodiment of the video-processing unit according to the invention is characterized in that said processing means, said memory manager and the memory are comprised on a single integrated circuit. A high degree of integration enables an economic design of the video display system.

A further embodiment of the video-processing unit according to the invention is characterized in that said processing means is arranged to resize an image represented by said input data signal.

A further embodiment of the video-processing unit according to the invention is characterized in that said processing means is further arranged to convert said input data signal representing an image into a color-sequential output signal. In order to reduce the size and weight of a video display system, only a single light-valve display device can be used in combination with a light source and color filter means, which alters the color of the light sequentially in, for example, red, green and blue. In that case, the information of the output signal supplied to the light-valve display device should contain serial red, green or blue information synchronously with the color of the color filter means. In general, most video data signals comprise the information of red, green and blue of a pixel in parallel. Conversion from the parallel color information into serial color information is then necessary and can be performed by a process running in the video-processing unit.

A further embodiment of the video-processing unit according to the invention is characterized in that said processing means is further arranged to convert said input data signal representing an image into a sub-field modulated output signal for controlling the output device. Sub-field modulation is known from the cited European patent application EP-A 840522. Some types of displays use a digital control of individual pixels, such as, for example the DMD. The pixels of the DMD can maintain their 'on' or 'off'-state for controlled display. Pulse-width modulation techniques are used to achieve intermediate illumination between white and black levels. A further embodiment of the video-processing unit according to the invention is characterized in that the memory manager has a further input for a second input data signal, and the memory manager is further arranged to transfer the second data input signal to the memory means.

The invention further relates to a video display system. It is an object of the invention to provide a video display system with a flexible architecture which is capable of handling resizing input data as well as a display-specific type of processing. To this end, a video display system according to the invention is characterized in that the video display system comprises a digital video-processing unit as described hereinbefore, having the output for providing an output data signal and a display system coupled to the output of said digital video-processing unit for displaying the output data signal.

BRIEF DESCRIPTION OF THE DRAWING FIGURES

Figure 2:
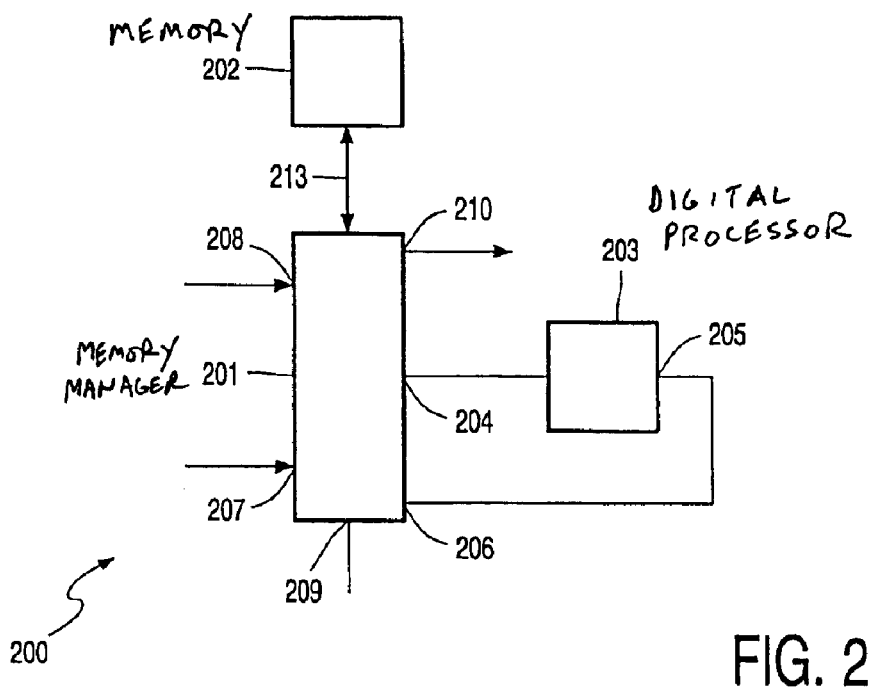
Figure 3:
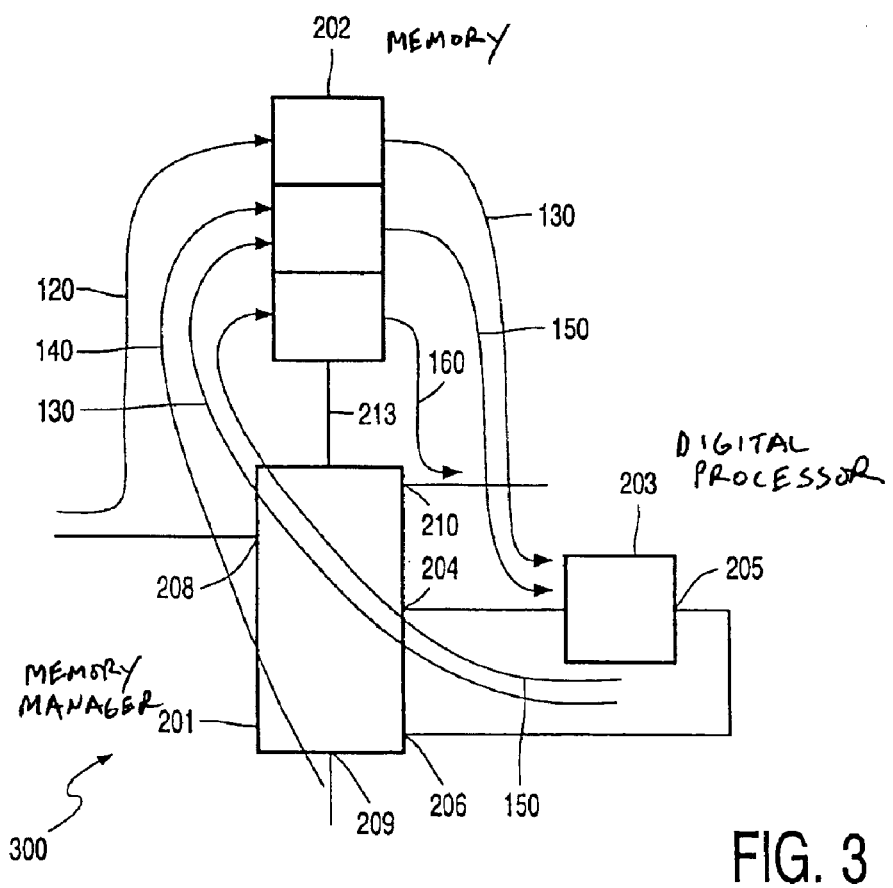

These and other aspects of the invention are further explained with reference to the accompanying drawing which FIG. 1 shows a block diagram of a video display system, FIG. 2 shows a block diagram of the video-processing unit according to the invention, and FIG. 3 shows a block diagram of the processes scheduled in the video-processing unit.

DETAILED DESCRIPTION

FIG. 1 shows a block diagram of a video display system 100, elucidating the various processes, that may be performed by the video-processing unit in accordance with the invention. A function of the display system is, for example, a resizing operation, i.e. to match the number of actual lines within a picture frame to the number of lines and the number of columns of the display panel. The display panel may consist of a fixed number of columns and lines. Examples of such matrix display are light valve projection displays such as an LCD projection display, or a digital micro-mirrored device (DMD) projection display, plasma-addressed liquid crystal displays (PALC) or plasma display panels. A second function of the display system may be a geometric key stone correction. Other functions of the display system may be bit-mapped on-screen display, conversion of a video data signal into a color-sequential output for DMD or reflective LCD and conversion of an output data signal into a sub-field modulation for plasma displays, PALC displays or DMD projection displays.

The block diagram indicates the different processes performed by the video display system. The block diagram shows a first RGB source 101, first memory means, for example a first frame buffer 103, a first memory manager, for example a first frame buffer controller 102, and a first scaling unit 104. The first R, G, B source provides digital video in which, for example 8 bits per color are used. The first frame buffer controller 102 is coupled via a bidirectional port to the first frame buffer 103. An output of the first frame buffer controller 102 is coupled to the first scaling unit 104. The scaling unit 104 may be a processor module programmed to scale the image so that the scaled image matches the actual display resolution. The display resolution of the digital video signal may not always match the resolution and/or aspect ratio of the display unit. The scaling unit 104 upscales or downscales the input signal to fit the display resolution in each dimension or in both dimensions. Horizontal scaling alters the number of pixels per line. Vertical scaling alters the number of actual lines per frame. Scaling algorithms are known in the art of image processing and make use of interpolation or finite impulse response (FIR) filtering.

Furthermore, the block diagram of the display system 100 shows a second memory manager, for example a second frame buffer controller 105, and a second memory, for example a second frame buffer 106, and a second RGB source, for example a VCR or an On Screen Display source (OSD) 107, and a second scaling unit 108. An output of the first scaling unit 104 is coupled to the second frame buffer controller 104. The OSD source 107 is coupled to a second input of the second frame buffer controller 105. The second frame buffer controller 105 is coupled via a bidirectional port to the second frame buffer 106. An output of the second frame buffer controller 105 is coupled to the second scaling unit 108. Furthermore, the block diagram of the display system 100 shows a third memory manager 109, for example a third frame buffer controller 109, a third memory, for example a third frame buffer 110, and a display unit, for example an LCD monitor 111. An output of the second scaling unit 108 is coupled to the third frame buffer controller 109. The third frame buffer controller 109 is coupled via a bidirectional port to the third frame buffer 110. An output of the third frame buffer controller 110 is coupled to the LCD-monitor 111. The LCD monitor 111 may comprise D/A converters for each color channel to convert the digital data into analog data, and an LCD projection device having separate R, G, B channels which are optically combined to one image which is enlarged and projected on a screen by an optical system. Each channel is provided with an LCD light valve which comprises an array of a fixed number of pixels, for example 800×600.

The architecture indicated by the block diagram representation of the display system 100 performs the following processes, which are indicated 1 as arrows in FIG. 1.

I. An incoming video data stream is stored in the first frame buffer 103 by the first frame buffer controller 102, indicated as a first arrow 120.

II. The stored video data stream is read from the first frame buffer 103 and resized by the first scaling unit 104, and the resized video date stream is stored in the second frame buffer 106, indicated as a second arrow 130.

III. The OSD data is stored in the second frame buffer 106, using an overlay technique. In the overlay technique, an additional bit indicates whether the incoming OSD data overwrites a specific location in the second frame buffer 106, indicated as a third arrow 140.

IV. The resized video data stream is read from the second frame buffer 106, corrected by the second scaling unit 108 and stored in the third frame buffer 110, indicated as a fourth arrow 150.

V. The corrected video data stream is read from the third frame buffer 110 and sent to the output device or display device 111, indicated as a fifth arrow 160.

According to the invention, a single digital video-processing unit can perform these processes in time multiplex.

FIG. 2 shows a block diagram 200 of the architecture of the video-processing unit in accordance with the invention. The digital video-processing unit comprises processing means 203, for example, a digital processor for processing an input signal to an output data signal, memory means 202, for example, a video memory for storing said input signal prior to supply to said digital processor and for storing said output signal after processing in the digital processor 203, and a video memory manager 201 coupled to the digital processor 203 and the video memory 202. An output of the digital processor is coupled to an input of the video memory manager 201, and the video memory manager is further arranged to transfer the output data signal from the digital processor 213 to the video memory 202 for storing the output data signal, and to transmit the output data signal from the video memory 202 to the output device 111. Furthermore, the video memory manager 201 may have, for example two R, G, B inputs 207, 208 and one OSD input 209. The OSD data may be supplied to the video memory manager 201 by, for example an I²C-signal. Furthermore, the video memory manager 201 is coupled via a bidirectional port 203 to the video memory 202 and via a first output port 210 to the digital processor 203. In accordance with the invention, an output 205 of the digital processor 203 is coupled to a further input 206 of the video memory manager 201. An RGB output 210 of the video memory manager 201 is coupled to the display unit 111. Furthermore, the video memory manager 201 supplies the processed R, G, B signals to the display unit 111. All processes listed above can be micro-programmed in the video memory manager 201 and the digital processor 203 of the video-processing unit 300. In a first embodiment, the video memory 202 preferably comprises the three frame buffers 103, 106, 110, and the size of the video memory must be equal to the sum of the three frame buffers 103, 106, 110. The video memory 202 is realized in, for example, SDRAM and, together with the digital processor 203 and the video memory manager 201 may be integrated on a single chip. The video-processing unit can be designed in, for example, a conventional CMOS process designed to operate at a 400 MHz clock frequency.

The video-processing unit 200 comprises a digital processor 203 to resize the input data signal and the output data signal and to correct said output data signal geometrically, as executed, respectively, by the first and second scaling units 104, 108 in the block diagram of FIG. 1. However, the digital processor 200 can only access the video memory 202 via the memory manager 201 for one process at a time. Therefore, the processes of resizing and correcting the video data have to be executed in the digital processor in time multiplex. In order to avoid frame tearing, all of said processes I to V have to be carefully scheduled in time. Frame tearing is a motion-dependent image artifact causing information of a first frame of an image to leak into information of a second frame of an image. The scheduling of the different processes in the digital processor is such that, with respect to the block diagram in FIG. 1, old data is read from a first frame buffer 103 and stored via the scaling unit 104 in a second frame buffer 106 before new data overwrites the old data in the first frame buffer 103. Furthermore, the function of the three frame buffer controllers 102, 105, 109 are performed by the video memory manager 201.

FIG. 3 shows a process diagram indicating the processes running in time multiplex in the digital video-processing unit 300 with the new architecture. Each of the processes I to V, listed above, is represented in the process diagram by an arrow and the corresponding number as indicated in FIG. 1. In order to reduce the size of the video memory 202, the first and third frame buffers 103, 110 of the architecture indicated in the block diagram of FIG. 1 are realized as cyclic memory buffers in a second embodiment of the invention. A minimum memory size is advantageous for integration of a memory, for example SDRAM, in a single chip design of the video-processing unit.

The cyclic frame buffers store only a part of a complete image, for example several, (5 or 10) lines of the complete image or frame. When the first and third frame buffers 103, 110 comprise cyclic frame buffers, the different processes I to V running on the digital video-processing unit require proper scheduling. For example, process 1120 and process II 130 are scheduled in such a way, referring to the block diagram in FIG. 1, old data is already read before new input data overwrites the old data in the first frame buffer 103, and processes IV and V are scheduled in such a way processed data is stored in the third frame buffer 110, before this data is read.

In order to reduce the bandwidth of the memory 202, processes I and II do not necessarily need to process all pixels of one frame every field. To this end, in a third embodiment of the invention, processes I and II can update the complete image as is stored in the second frame buffer 106 in a period covering several frame times, for example, in the odd field, only the left half of the image of the screen can be processed, and the right half of the screen can be processed in the even field. In this way, the total bandwidth of the video memory 202, i.e. the sum of the bandwidths of the first, second and third frame buffers 103, 106, 110 of the different processes, is reduced. However, when this reduced bandwidth is applied, frame tearing may be introduced. Furthermore, the bandwidth of the third frame buffer 110 of process V cannot be reduced, because no continuous data stream can then be sent to the display unit 111, which data stream is related to a predetermined output clock frequency of the display unit.

Other video signal processes can also be executed in time-multiplex by the video-processing unit according to the invention, for example, conversion of a video input data signal into a color-sequential data output signal or conversion of a video input data signal into a sub-field modulated output signal. In order to reduce the size and weight of a video display system, only a single display device may be used in combination with a light source and color filter means, which alters the color of the light sequentially in, for example, red, green and blue. In that case the information of the output signal supplied to the display device should contain serial red, green or blue information synchronously with the color of the color filter means. Conversion from the parallel color information into serial color information can be performed by a separate process running in the video-processing unit.

Sub-field modulation is known from the cited European patent application EP-A 840522. Some types of displays use a digital control of individual pixels, such as, for example the DMD. The pixels of the DMD can maintain their 'on' or 'off'-state for controlled display. Pulse-width modulation techniques are used to achieve intermediate illumination levels between white and black. Such a sub-field modulation can also be performed by a separate process running in the video-processing unit.

It is to be noted that the different processes running in the video-processing unit may be changed dynamically. This means that the different processes may be changed in such a way that no visible interruption of the displayed images occurs. This may be advantageous for displaying moving logos.

It should be noted that the above-mentioned embodiments illustrate rather than limit the invention, and that those skilled in the art will be able to design many alternative solutions without departing from the scope of the claims. In the claims enumerating several means, several of these means may be embodied by one and the same item of hardware. The invention is preferably applied in LCD projectors and other matrix displays (digital micro-mirrored device, plasma display mirrored device, plasma display panel, PALC displays etc.) but may also be applied with other devices.

What is claimed is:

1. A digital video-processing unit for processing an input signal to an output data signal for a display unit, said video-processing unit comprising
   a processor for processing the input signal to the output data signal, the processing including a first resizing and a second resizing,
   memory means for storing the input signal prior to supply to said processor, and
   a memory manager coupled with the processor and the memory means, the memory manager being arranged to transfer the input data signals to the memory means and to transfer the stored input data signal from the memory means to the processor for the first resizing, respectively, wherein an output of the processor is coupled to an input of the memory manager, wherein the memory manager is further arranged to transfer the output data signal from the processor to the memory means for storing the output data signal, and to transfer the stored output data signal from the memory means to the display unit, and wherein the memory manager is further arranged to transfer the stored output data signal from the memory means to the processor, and said processor is further arranged to execute the second resizing on the stored data output signal, wherein said processor and said memory manager are arranged to execute different processes in time multiplex.

2. The digital video-processing unit of claim 1, wherein said processor, said memory manager and the memory means are comprised on a single integrated circuit.

3. The digital video-processing unit of claim 1, wherein said processor is arranged to resize an image represented by said input data signal.

4. The digital video-processing unit of claim 1, wherein said processor is further arranged to convert said input data signal representing an image into a color-sequential output signal.

5. The digital video-processing unit of claim 1, wherein said processor is arranged to convert said input data signal representing an image into a sub-field modulated output signal for controlling the display unit.

6. The digital video-processing unit of claim 1, wherein a part of the memory means is arranged as a cyclic memory for storing a part of an image represented by the input data signal.

7. The digital video-processing unit of claim 1, wherein the memory manager has a further input for a second data input signal, and the memory manager is arranged to transfer the second data input signal to the memory means.

8. A video display system comprising a digital video-processing unit as claimed in claim 1, having an output for providing the output data signal and a display system coupled to the output of said digital video-processing unit for displaying of said output data signal.

* * * * *